United States Patent
Hyun et al.

(10) Patent No.: US 7,738,685 B2
(45) Date of Patent: Jun. 15, 2010

(54) IMAGE PROCESSING SYSTEM AND METHOD FOR CONTROLLING GAINS FOR COLOR FLOW IMAGES

(75) Inventors: Dong Gyu Hyun, Seoul (KR); Hye Jung Kim, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 846 days.

(21) Appl. No.: 11/566,977

(22) Filed: Dec. 5, 2006

(65) Prior Publication Data

US 2007/0167795 A1 Jul. 19, 2007

(30) Foreign Application Priority Data

Dec. 6, 2005 (KR) .................. 10-2005-0117832

(51) Int. Cl.
*G06K 9/00* (2006.01)
*A61B 8/00* (2006.01)
(52) U.S. Cl. .................. 382/128; 382/165; 600/454
(58) Field of Classification Search .................. 382/100, 382/128, 129, 130, 131, 132, 133, 134, 162, 382/163, 164, 165, 166, 167, 194, 199, 232, 382/254, 256, 257, 274, 276, 291, 293, 305, 382/312; 600/543, 443, 441, 454, 463
See application file for complete search history.

(56) References Cited

U.S. PATENT DOCUMENTS

| 4,858,614 | A | * | 8/1989 | Stevens et al. | 600/543 |
| 4,873,984 | A | * | 10/1989 | Hunt et al. | 600/443 |
| 5,453,575 | A | * | 9/1995 | O'Donnell et al. | 600/463 |
| 5,477,858 | A | * | 12/1995 | Norris et al. | 600/441 |
| 7,238,158 | B2 | * | 7/2007 | Abend | 600/454 |
| 7,534,209 | B2 | * | 5/2009 | Abend et al. | 600/454 |

FOREIGN PATENT DOCUMENTS

JP 2006-217943 8/2006

* cited by examiner

*Primary Examiner*—Seyed Azarian
(74) *Attorney, Agent, or Firm*—Oblon, Spivak, McClelland, Maier & Neustadt, L.L.P.

(57) ABSTRACT

There is provided an image processing system, which includes: an image forming unit for forming a number of color flow images based on input image signals; a reference image selecting unit for selecting a reference image for gain control among the color flow images; a gain control value calculating unit for calculating a gain control value based on the reference image; and a gain control unit for controlling gains for the color flow images based on the gain control value.

13 Claims, 3 Drawing Sheets

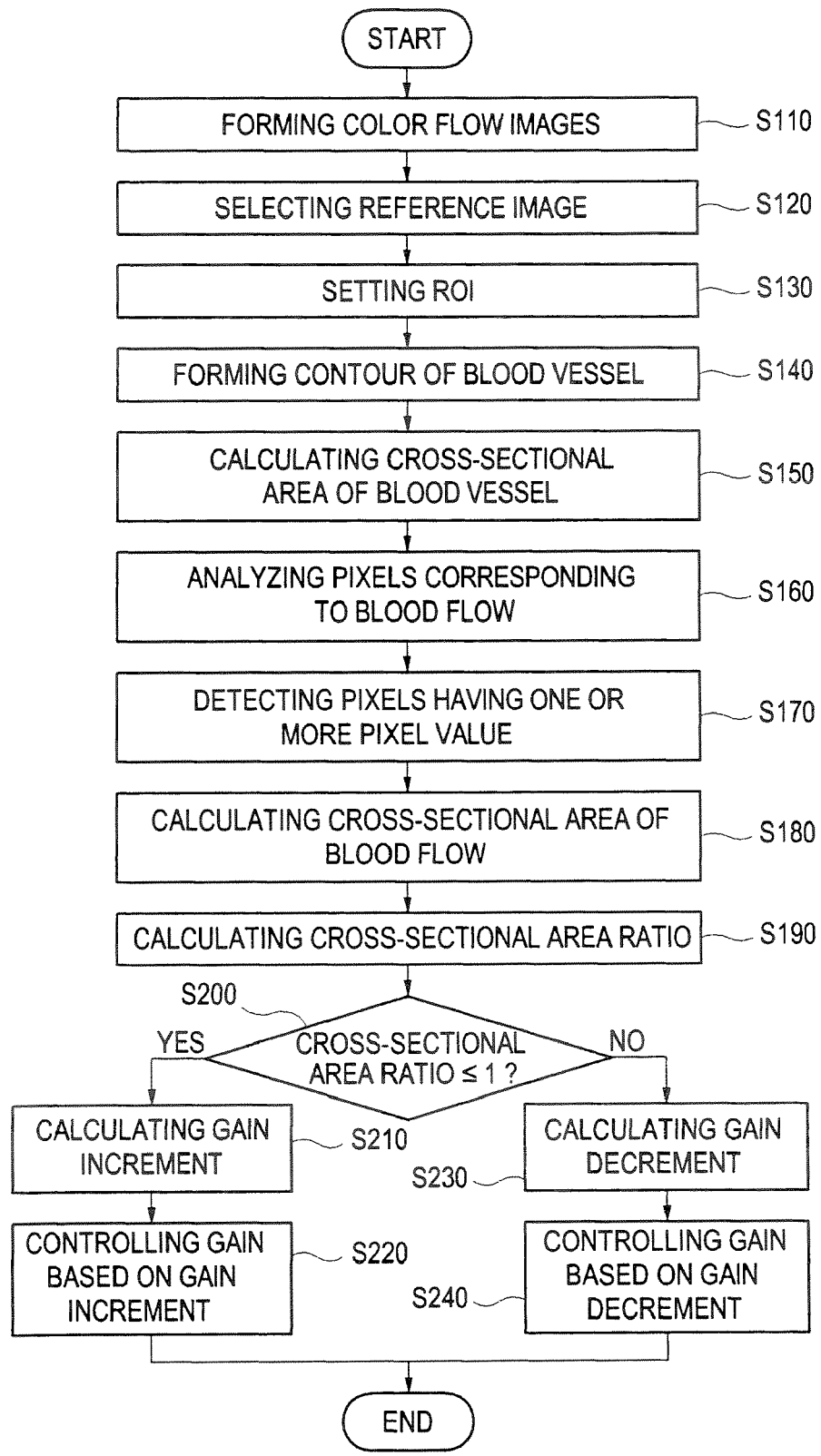

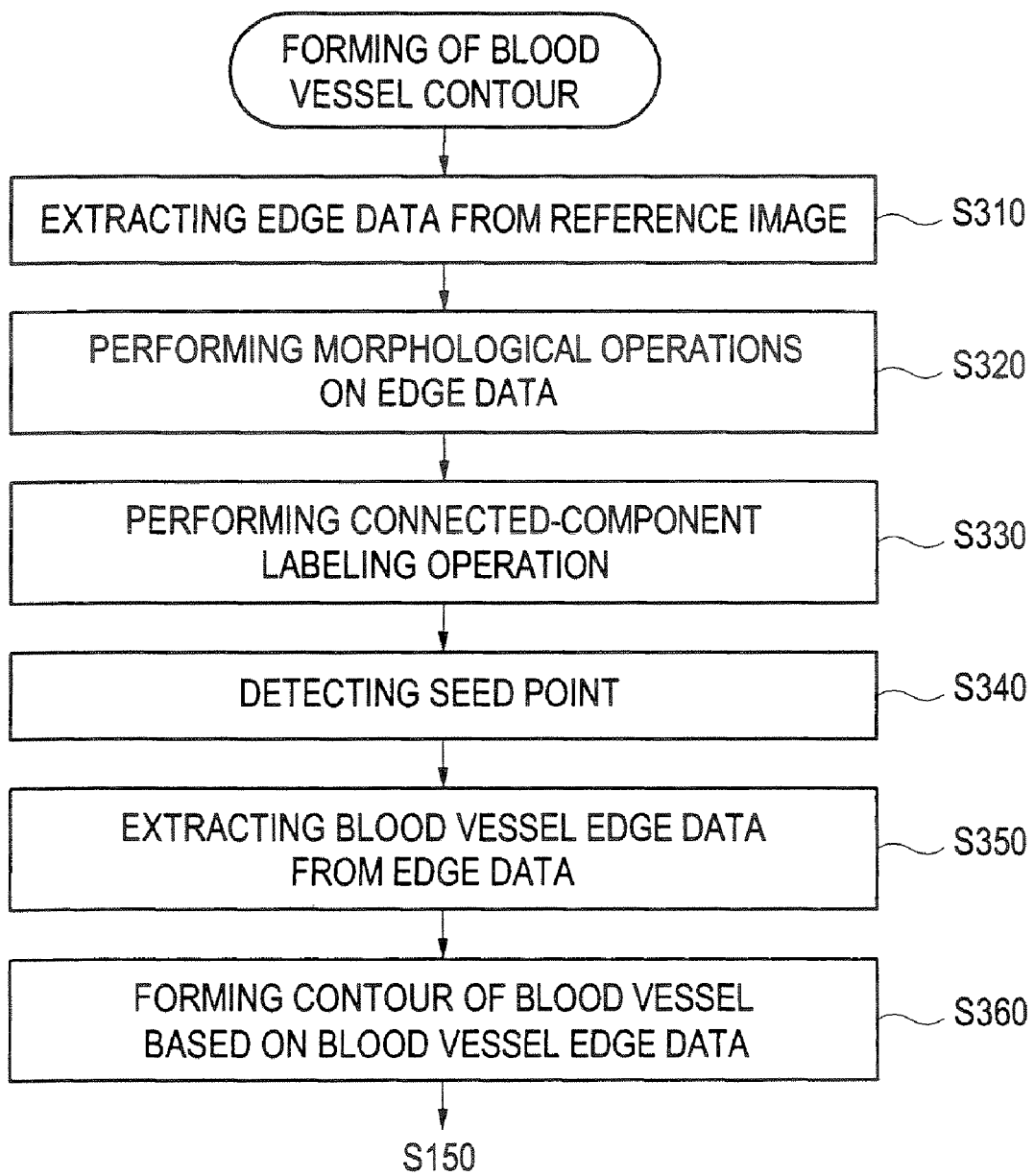

IMAGE PROCESSING SYSTEM AND METHOD FOR CONTROLLING GAINS FOR COLOR FLOW IMAGES

The present application claims priority from Korean Patent Application 10-2005-117832 filed on Dec. 6, 2005, the entire subject matter of which is incorporated herein by reference.

BACKGROUND

1. Field

The present invention generally relates to an image processing system, and more particularly to an image processing system and method for automatically controlling the gains for color flow images.

2. Background

An image processing system, which is used for processing an image of a target object and displaying the processed image, has been widely used. By way of an example, an image processing system for performing ultrasound diagnosis (hereinafter referred to as an "ultrasound diagnostic system") will be described.

Generally, an ultrasound diagnostic system has become an important and popular diagnostic tool due to its wide range of applications. Specifically, due to its non-invasive and non-destructive nature, the ultrasound diagnostic system has been extensively used in the medical profession. Modern high-performance ultrasound diagnostic systems and techniques are commonly used to produce two or three-dimensional (2D or 3D) diagnostic images of a target object. The ultrasound diagnostic system generally uses a probe including an array transducer having a plurality of transducer elements to transmit and receive ultrasound signals. The ultrasound diagnostic system forms ultrasound images of the internal structures of the target object by electrically exciting the transducer elements to generate ultrasound pulses that travel into the target object. The ultrasound pulses produce ultrasound echoes since they are reflected from a discontinuous surface of acoustic impedance of the internal structure, which appears as discontinuities to the propagating ultrasound pulses. Various ultrasound echoes return to the array transducer and are converted into electrical signals, which are amplified and processed to produce ultrasound data for forming an image of the internal structure of the target object.

Especially, a conventional ultrasound diagnostic system provides color flow images showing the velocities of a moving object and scatters. In the color flow images, the velocity and direction of the moving object such as blood flow in the heart or blood vessel are represented in various colors based on Doppler shift. For example, the following conventional method is used to interpret the above images: blood flow moving toward the probe is represented in red; blood flow moving away from the probe is represented in blue; fast blood flow is represented in light color; and slow blood flow is represented in dark color. Accordingly, it is possible to accurately visualize the blood flow in real time.

However, in the color flow images provided by the conventional ultrasound diagnostic system, a width of blood flow in the blood vessel may seem thinner or thicker than that of the vessel. In order to correct this, the gains for the color flow images should be controlled minutely, wherein such gain control is conducted manually. Therefore, the user has to perform a complicated operation to minutely control the gains for color flow images. Thus, the time required for diagnosis becomes longer.

BRIEF DESCRIPTION OF THE DRAWINGS

Arrangements and embodiments may be described in detail with reference to the following drawings in which like reference numerals refer to like elements and wherein:

FIG. 2 is a flowchart showing a process for automatically controlling the gains for color flow images according to one embodiment of the present invention; and FIG. 3 is a flowchart showing a process for forming the blood vessel contour according to one embodiment of the present invention.

DETAILED DESCRIPTION

Figure 1:
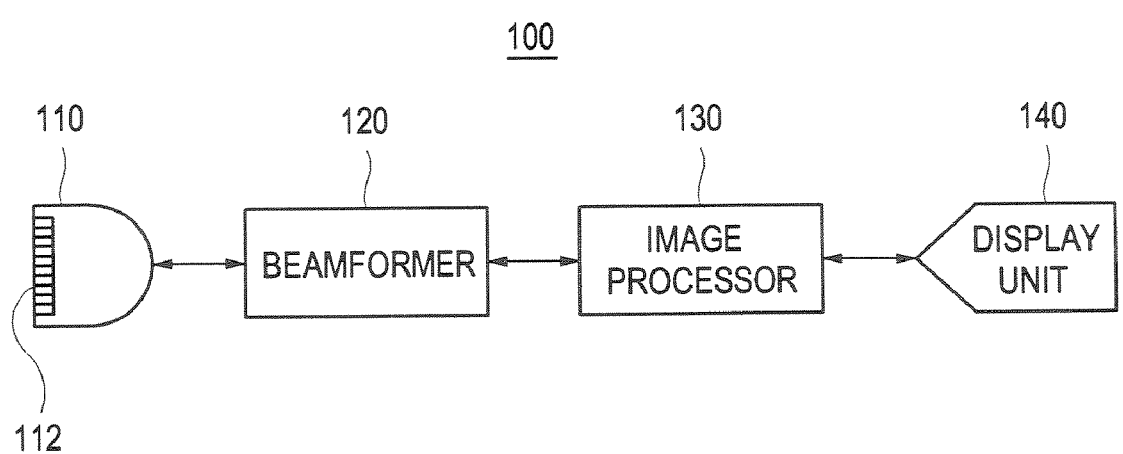
FIG. 1 is a block diagram showing an ultrasound diagnostic system constructed according to one embodiment of the present invention.

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Hereinafter, one embodiment of the present invention will be described with reference to the accompanying drawings. The ultrasound diagnostic system will be described as an example of an image processing system, which is constructed in accordance with the present invention. Other arrangements may also be used.

FIG. 1 is a block diagram showing an ultrasound diagnostic system constructed according to one embodiment of the present invention. As shown in FIG. 1, the ultrasound diagnostic system 100 includes a probe 110, a beamformer 120, an image processor 130 and a display unit 140.

The probe 110 includes a 1-dimensional or a 2-dimensional array transducer 112 including a plurality of transducer elements. The transmit signals, which are appropriately delayed in the beamformer 120 to form an ultrasound beam, are transmitted to the array transducer 112. Then, the ultrasound beam, which is produced in response to the transmit signals, is transmitted along a scan line set in a target object (not shown). The probe 110 receives ultrasound echo signals reflected from the target object and converts the ultrasound echo signals into electrical signals (hereinafter referred to as "receive signals"). The receive signals are transmitted to the beamformer 120.

The beamformer 120 provides delays of transmit signals to be transmitted to the array transducer 112 included in the probe 110 such that the ultrasound signals outputted from the array transducer 112 are focused on a focal point. Further, the beamformer 120 focuses the receive signals, which are received from the array transducer 112 of the probe 110, in consideration of the delays with which the echo signals are arrived at each transducer element. It then outputs a focused receive beam representing the energy level of the ultrasound echo signals reflected from the focal point.

The image processor 130 forms a number of color flow images based on the focused receive beam outputted from the beamformer 120. It then calculates cross-sectional areas of blood vessel and blood flow in the color flow images and controls the gains for the color flow images based on the calculated cross-sectional areas. The operations of the image processor 130 will be described in detail with reference to FIGS. 2 and 3. The color flow images processed by the image processor 130 are displayed on the display unit 140.

Hereinafter, an automatic gain control process conducted by the image processor 130 will be described with reference to FIG. 2. FIG. 2 is a flowchart showing a process for automatically controlling the gains for color flow images according to one embodiment of the present invention.

As shown in FIG. 2, at step S110, the image processor 130 forms image signals based on the focused receive beam outputted from the beamformer 120 and forms a number of color flow images based on the image signals. At step S120, the image processor 130 selects one of the formed color flow images as a reference image for controlling the gains, in which the blood flows at a maximum velocity. The reference image showing the blood flow of the maximum velocity is formed when the heart is at its maximum contraction. If the gain is increased based on a color flow image formed when the heart is at its maximum relaxation, then a width of blood flow in the blood vessel may seem thicker than that of the vessel in the color flow image. Accordingly, as described above, the color flow image showing the blood flow of the maximum velocity at the heart's maximum contraction is selected as the reference image to prevent the diameter of blood flow in the blood vessel from exceeding that of the vessel in a gain increase.

The image processor 130 sets a region of interest (ROI) in the reference image at step S130. It then forms the contour of the blood vessel on the reference image within the ROI at step S140. Detailed description of step S140 will be provided later with reference to FIG. 3. At step S150, the image processor 130 calculates a cross-sectional area of the blood vessel based on the contour of the blood vessel.

Next, at step S160, the image processor 130 analyzes the pixels corresponding to the blood flow existing in the ROI set on the reference image. Such pixel analysis can be performed by using a blood flow histogram. Then, the image processor 130 detects the pixels having pixel values equal to or greater than 1 at step S170. It then calculates the cross-sectional area of the blood flow based on the detected pixels at step S180.

At step 190, the image processor 130 calculates a cross-sectional area ratio based on the cross-sectional areas of the blood vessel and the blood flow, which are obtained at steps 150 and 180, respectively. In this embodiment, the cross-sectional area ratio is defined as a ratio of the cross-sectional area of the blood flow to the cross-sectional area of the blood vessel.

The image processor 130 checks whether the cross-sectional area ratio is equal to or smaller than 1 at step S200. If it is determined that the cross-sectional area ratio is equal to or smaller than 1 at step S200, then the image processor 130 calculates a gain increment corresponding to the cross-sectional area ratio at step S210. It then increases the gains for the color flow images based on the calculated gain increment at step S220.

On the other hand, if it is determined that the cross-sectional area ratio is larger than 1 at step S200, then the image processor 130 calculates a gain decrement corresponding to the cross-sectional area ratio at step S230. It then decreases the gains for the color flow images based on the calculated gain decrement at step S240. After the gains are controlled, the automatic gain control process is completed.

Hereinafter, a process for forming the blood vessel contour will be described with reference to FIG. 3. FIG. 3 is a flowchart showing a process for forming the blood vessel contour in accordance with one embodiment of the present invention.

As shown in FIG. 3, the image processor 130 extracts edge data from the reference image at step S310. The edge data can be extracted through various algorithms, for example, Canny edge detection algorithm.

The image processor 130 performs morphological operations on the extracted edge data at step S320. Such morphological operations for performing a morphological transformation process on the image include: a reduction operation for reducing the amount of the edge data; a dilation operation for expanding boundary pixels in the edge data on which the reduction operation is performed; and an erosion operation for removing noise components from the edge data.

Then, the image processor 130 finds all connected-components in the edge data and then performs a connected-component labeling operation for assigning a unique label to pixels belonging to the same connected-component at step S330. In this case, the connected-component labeling operation may use the sequential connected components algorithm using 4-connectivity.

The image processor 130 detects a seed point corresponding to a center of gravity of the edge data at step S340. It then extracts blood vessel edge data from the edge data in a radial direction around the seed point at step S350. The image processor 130 forms the contour of the blood vessel based on the extracted blood vessel edge data at step S360.

As described above, in accordance with the present invention, the gains of the color flow images can be automatically controlled based on the cross-sectional areas of the blood vessels and the blood flow in the color flow image, whereby the user can easily observe the color flow image.

An embodiment may be achieved in whole or in part by an image processing system, which includes: an image forming unit for forming a number of color flow images based on input image signals; a reference image selecting unit for selecting a reference image for gain control among the color flow images; a gain control value calculating unit for calculating a gain control value based on the reference image; and a gain control unit for controlling gains for the color flow images based on the gain control value.

Any reference in this specification to "one embodiment," "an embodiment," "example embodiment," etc., means that a particular feature, structure or characteristic described in connection with the embodiment is included in at least one embodiment of the invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image processing system, comprising:
   an image forming unit for forming a number of color flow images based on input image signals;
   a reference image selecting unit for selecting a reference image for gain control among the color flow images;
   a gain control value calculating unit for calculating a gain control value based on the reference image; and
   a gain control unit for controlling gains for the color flow images based on the gain control value,
   wherein the gain control value calculating unit forms a contour of a blood vessel by the following steps: extracting edge data from the reference image; performing morphological operations on the edge data; performing a connected-component labeling operation; detecting a seed point in the edge data; extracting blood vessel edge data from the edge data based on the seed point; and forming the contour of the blood vessel based on the blood vessel edge data.

2. The image processing system of claim 1, wherein the input image signals are ultrasound image signals.

3. The image processing system of claim 1, wherein the reference image is a color flow image showing blood flow in a blood vessel at a maximum velocity.

4. The image processing system of claim 3, wherein the gain control value calculating unit calculates cross-sectional areas of the blood vessel and the blood flow in the reference image, the gain control value calculating unit further being configured to calculate the gain control value based on the cross-sectional areas of the blood vessel and the blood flow.

5. The image processing system of claim 4, wherein the gain control value calculating unit forms a contour of the blood vessel in the reference image to calculate the cross-sectional area of the blood vessel.

6. The image processing system of claim 4, wherein the gain control value calculating unit detects pixels having pixel values equal to or greater than 1 among pixels showing the blood flow in the reference image to calculate the cross-sectional area of the blood flow.

7. A method of processing an image, comprising:
   a) forming a number of color flow images based on input image signals;
   b) selecting a reference image for gain control among the color flow images;
   c) calculating a gain control value based on the reference image; and
   d) controlling gains for the color flow images based on the gain control value,
   wherein the step c) includes:
   c111) extracting edge data from the reference image;
   c112) performing morphological operations on the edge data;
   c113) performing a connected-component labeling operation;
   c114) detecting a seed point in the edge data;
   c115) extracting blood vessel edge data from the edge data based on the seed point; and
   c116) forming the contour of the blood vessel based on the blood vessel edge data.

8. The method of claim 7, wherein the input image signals are ultrasound image signals.

9. The method of claim 7, wherein the reference image is a color flow image showing blood flow in a blood vessel at a maximum velocity.

10. The method of claim 9, wherein the step c) includes:
    c1) calculating a cross-sectional area of the blood vessel in the reference image;
    c2) calculating a cross-sectional area of the blood flow in the reference image; and
    c3) calculating the gain control value based on the cross-sectional areas of the blood vessel and the blood flow.

11. The method of claim 10, wherein the step c1) includes:
    c11) forming a contour of the blood vessel in the reference image; and
    c12) calculating the cross-sectional area of the blood vessel based on the contour of the blood vessel.

12. The method of claim 10, wherein the step c2) includes:
    c21) analyzing pixels showing the blood flow in the reference image;
    c22) detecting pixels having pixel values equal to or greater than 1 among pixels showing the blood flow in the reference image; and
    c23) calculating the cross-sectional area of the blood based on the detected pixels.

13. The method of claim 10, wherein the step c3) includes:
    c31) calculating a cross-sectional area ratio based on the cross-sectional areas of the blood vessel and the blood flow;
    c32) checking whether the cross-sectional area ratio is equal to or smaller than 1;
    c33) if it is determined that the cross-sectional area ratio is equal to or smaller than 1, calculating a gain increment serving as the gain control value based on the cross-sectional area ratio and increasing gains for the color flow images based on the calculated gain increment; and
    c34) if it is determined that the cross-sectional area ratio is larger than 1, calculating a gain decrement serving as the gain control value based on the cross-sectional area ratio and decreasing gains for the color flow image based on the calculated gain decrement.

\* \* \* \* \*